(12) United States Patent
Jung et al.

(10) Patent No.: US 10,112,605 B2
(45) Date of Patent: Oct. 30, 2018

(54) METHOD FOR ENFORCED DISCHARGE OF A HYBRID VEHICLE

(71) Applicant: HYUNDAI MOTOR COMPANY, Seoul (KR)

(72) Inventors: Tae Hee Jung, Seongnam-si (KR); Hyun Min Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 12 days.

(21) Appl. No.: 15/380,701

(22) Filed: Dec. 15, 2016

(65) Prior Publication Data

US 2018/0105164 A1    Apr. 19, 2018

(30) Foreign Application Priority Data

Oct. 18, 2016   (KR) .................. 10-2016-0134830

(51) Int. Cl.
| | |
|---|---|
| *B60W 20/50* | (2016.01) |
| *B60W 10/06* | (2006.01) |
| *B60W 10/08* | (2006.01) |
| *F02D 41/22* | (2006.01) |
| *F02N 11/08* | (2006.01) |
| *F02D 41/04* | (2006.01) |

(Continued)

(52) U.S. Cl.
CPC ............ *B60W 20/50* (2013.01); *B60W 10/06* (2013.01); *B60W 10/08* (2013.01); *F02D 41/042* (2013.01); *F02D 41/22* (2013.01); *F02N 11/04* (2013.01); *F02N 11/08* (2013.01); *F02N 11/0862* (2013.01); *B60W 2710/248* (2013.01); *F02D 2041/227* (2013.01); *F02N 11/10* (2013.01); *F02N 2011/0896* (2013.01); *Y10S 903/93* (2013.01)

(58) Field of Classification Search
CPC ...... B60W 20/10; B60W 10/08; B60W 20/50; B60W 50/038; B60W 10/26; B60W 10/06; B60W 50/0205; B60W 2710/242; B60W 2710/0644; B60W 20/00; B60L 3/0084; B60L 3/04; Y10S 903/93; F16H 2061/126
USPC ........................................... 701/1, 22
See application file for complete search history.

(56) References Cited

U.S. PATENT DOCUMENTS 7,163,072 B2 * 1/2007 Yamaguchi ............. B60K 6/26
                                             180/65.24
7,227,332 B2 * 6/2007 Suzuki .................. B60L 3/0023
                                             180/65.265

(Continued)

FOREIGN PATENT DOCUMENTS

| JP | 2014177254 | 9/2014 |
|---|---|---|
| KR | 20130053037 | 5/2013 |

*Primary Examiner* — Yazan A Soofi
(74) *Attorney, Agent, or Firm* — Lempia Summerfield Katz LLC (57) ABSTRACT

A method for enforced discharge of a hybrid vehicle is aimed at discharging a voltage formed in a high-voltage system of a hybrid vehicle to safely remove risk factors due to high voltage when enforced discharge is requested. The method includes determining whether enforced discharge is requested, speed-controlling a motor connected to an engine so as to transmit power to the engine to reduce speed of the motor to zero revolutions per minute, stopping the engine connected to the speed-controlled motor when the enforced discharge is requested, and performing enforced discharge control for enforced-discharging a voltage of a high-voltage system when the engine is stopped.

10 Claims, 4 Drawing Sheets

(51) Int. Cl.
*F02N 11/04* (2006.01)
*F02N 11/10* (2006.01)

(56) References Cited

U.S. PATENT DOCUMENTS

| | | | | |
|---|---|---|---|---|
| 8,013,548 | B2* | 9/2011 | King | B60L 11/1868 |
| | | | | 307/10.1 |
| 8,020,650 | B2* | 9/2011 | Van Maanen | B60L 3/0046 |
| | | | | 180/65.265 |
| 8,631,894 | B2* | 1/2014 | Ashida | B60L 3/0007 |
| | | | | 180/274 |
| 9,371,074 | B1* | 6/2016 | Luehrsen | B60W 50/02 |
| 9,475,490 | B2* | 10/2016 | Youn | B60W 20/50 |
| 2003/0137275 | A1* | 7/2003 | Suzuki | B60L 3/0023 |
| | | | | 320/104 |
| 2004/0129465 | A1* | 7/2004 | Yamaguchi | B60K 6/26 |
| | | | | 180/65.24 |
| 2009/0319109 | A1* | 12/2009 | Ando | B60K 1/02 |
| | | | | 701/22 |
| 2010/0090525 | A1* | 4/2010 | King | B60L 11/1868 |
| | | | | 307/10.1 |
| 2010/0236851 | A1* | 9/2010 | Van Maanen | B60L 3/0046 |
| | | | | 180/65.265 |
| 2012/0309588 | A1* | 12/2012 | Ashida | B60L 3/04 |
| | | | | 477/7 |
| 2013/0066510 | A1* | 3/2013 | Lasson | B60L 3/0084 |
| | | | | 701/22 |
| 2013/0253749 | A1* | 9/2013 | Hayashi | B60K 6/445 |
| | | | | 701/22 |
| 2016/0031440 | A1* | 2/2016 | Youn | B60W 20/50 |
| | | | | 701/22 |
| 2017/0136913 | A1* | 5/2017 | Yang | B60L 11/1811 |

* cited by examiner

METHOD FOR ENFORCED DISCHARGE OF A HYBRID VEHICLE

CROSS-REFERENCE TO RELATED APPLICATION

This application claims under 35 U.S.C. § 119(a) the benefit of priority to Korean Patent Application No. 10-2016-0134830 filed on Oct. 18, 2016, the entire contents of which are incorporated herein by reference.

BACKGROUND

(a) Technical Field

The present disclosure relates to a method for enforced discharge of a hybrid vehicle. More particularly, the present disclosure relates to a method for enforced discharge of a hybrid vehicle for discharging a voltage formed in a high-voltage system of a hybrid vehicle to safely remove risk factors due to high voltage when enforced discharge is requested. The voltage discharge may be of the entire high voltage formed in the high voltage system.

(b) Background Art

A hybrid electric vehicle (HEV) is a vehicle using two or more different types of driving sources. In general, a HEV is a vehicle powered by a motor that is operated with power from a battery and an engine that also provides power by internal combustion.

Figure 1:
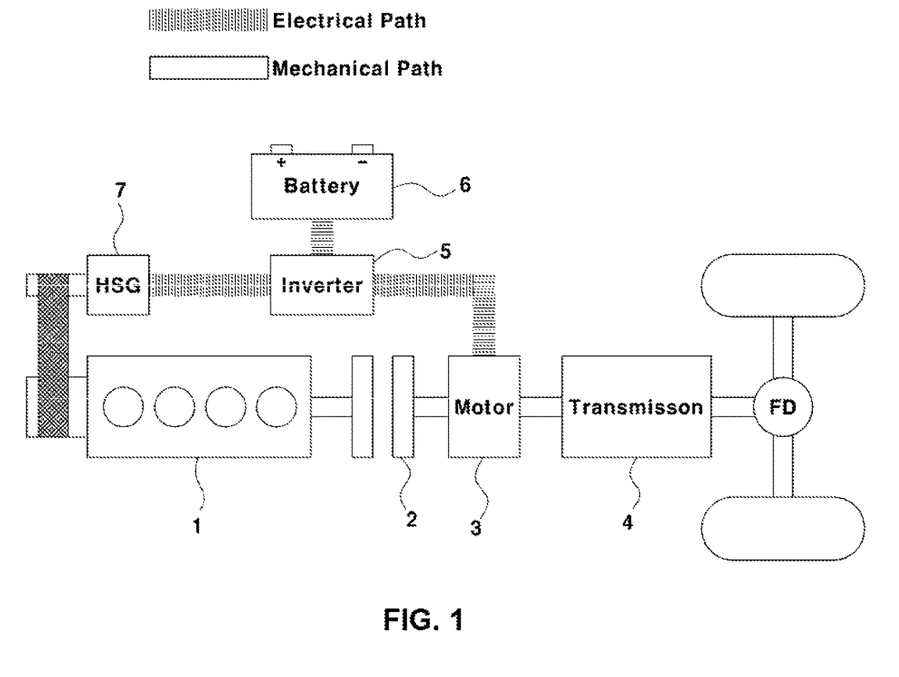
FIG. 1 is a schematic diagram illustrating a structure of a powertrain of a HEV.

FIG. 1 is a diagram illustrating a structure of a powertrain of a HEV. As illustrated in the drawing, a motor 3 for powering a vehicle may be connected to a transmission 4. An output shaft of the motor 3 is connected to a transmission input shaft.

In further detail, the HEV may include an engine 1 and the motor 3 as power sources for the vehicle, an engine clutch 2 interposed between the engine 1 and the motor 3, the transmission 4 connected to the output shaft of the motor 3, an inverter 5 for driving the motor 3, and a battery 6 that is connected to the motor 3 through the inverter 5 to be chargeable and dischargeable as a power source of the motor 3.

In FIG. 1, a hybrid starter generator (HSG) 7 is a motor that is connected to the engine 1. The HSG 7 transfers power and turns on the engine 1 or generates electricity using power transferred from the engine 1.

The engine clutch 2 may perform a coupling operation or a release operation according to hydraulic pressure so as to close or open a space between the engine 1 and the motor 3 for transmitting power. The inverter 5 may convert direct current (DC) of the battery 6 into three-phase alternating current (AC) and apply the converted current in order to drive the motor 3.

The transmission 4 may change power of the motor 3 or combined power of the engine 1 and the motor 3, and transmit the power to a driving wheel through a driveshaft.

The HEV having the above components may be driven in an electric vehicle (EV) mode as a pure mode of an electric vehicle using only power of the motor 3 or a HEV mode in which combined power of the engine 1 and the motor 3 are used.

During braking via a brake system or coasting based on inertia, an energy regeneration mode for recovering kinetic energy of a HEV through the motor 3 and then charging (motor-charging) the battery 6 is executed.

In the energy regeneration mode, the motor 3 that receives kinetic energy of a vehicle generates electricity and recharges the battery 6 connected to the motor 3 through the inverter 5.

In a HEV, a hybrid control unit (HCU) is installed as a higher controller for controlling an overall operation of the HEV and various other controllers for controlling various devices are installed.

In one instance, the HEV may include an engine management system (EMS) for controlling an operation of an engine, a motor control unit (MCU) for controlling an operation of a motor, a transmission control unit (TCU) for controlling an operation of a transmission, a battery management system (BMS) for collecting battery state information and using the information to control charge and discharge of a battery or providing the information to other controllers, a brake controller for performing brake control of the vehicle, and the like.

The HCU and the above controllers cooperatively control devices in a vehicle while transmitting and receiving information therebetween via a controller area network (CAN) communication and a higher controller transmits a control command to a lower controller while collecting various information from lower controllers.

In a HEV, a motor 3 receives high-power electric energy from a high-voltage main battery 6 during motor operation. The battery 6 receives electric energy, recovered from kinetic energy of the vehicle, from the motor 3 during regeneration through an inverter that powers the motor and controls regeneration.

In addition, a high-voltage main relay is installed between the inverter and the main battery. A capacitor with high-capacity and high-voltage for stably receiving power from the main battery is installed in the inverter for powering the motor.

The capacitor suppresses noise, ripple, and the like, of supplied power to attenuate voltage change.

When an inverter of a system performs enforced discharge during engine driving when the main relay is shut off, the engine is rotated and thus, counter electromotive force is generated while the motor connected to the engine is simultaneously rotated.

Accordingly, even if enforced discharge is performed, predetermined amplitude of voltage is generated and thus 100% enforced discharge of a high-voltage system including a capacitor is not performed.

This acts as a high risk factor in terms of safety and when a voltage is not 100% discharged, danger occurs due to high voltage while an operator performs an operation.

SUMMARY OF THE DISCLOSURE

The present disclosure is directed to a method for enforced discharge of a hybrid vehicle. An object of the present disclosure is to provide a method for enforced discharge of a hybrid vehicle that may be able to eliminate risk factors due to high voltage by discharging all of the high voltage formed in a high voltage system of a hybrid vehicle when enforced discharge is required.

In one aspect, the present disclosure provides a method for enforced discharge of a HEV, including: determining whether enforced discharge is requested, speed-controlling a motor connected to an engine so as to transmit power to the engine to reduce speed of the motor to 0 revolutions per minute (rpm), stopping the engine connected to the speed-controlled motor when the enforced discharge is requested, and performing enforced discharge control for enforced-discharging a voltage of a high-voltage system when the engine is stopped.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

Hereinafter, reference will be made to various embodiments of the present disclosure, examples of which are illustrated in the accompanying drawings and described below. While the disclosure will be described in conjunction with certain embodiments, it will be understood by those having ordinary skill in the art that the present description is not intended to limit the disclosure to those embodiments. On the contrary, the disclosure is intended to cover not only the disclosed embodiments, but also various alternatives, modifications, equivalents, and other embodiments, which may be included within the spirit and scope of the disclosure as defined by the appended claims.

In the present specification, it should be understood that terms such as "including" or "having", etc., are intended to indicate the existence of the elements disclosed in the specification, and are not intended to preclude the possibility that one or more elements may exist or may be added.

To aid in understanding the present disclosure, a high-voltage system of a hybrid vehicle will be described below.

FIG. 1 is described above.

Figure 2:
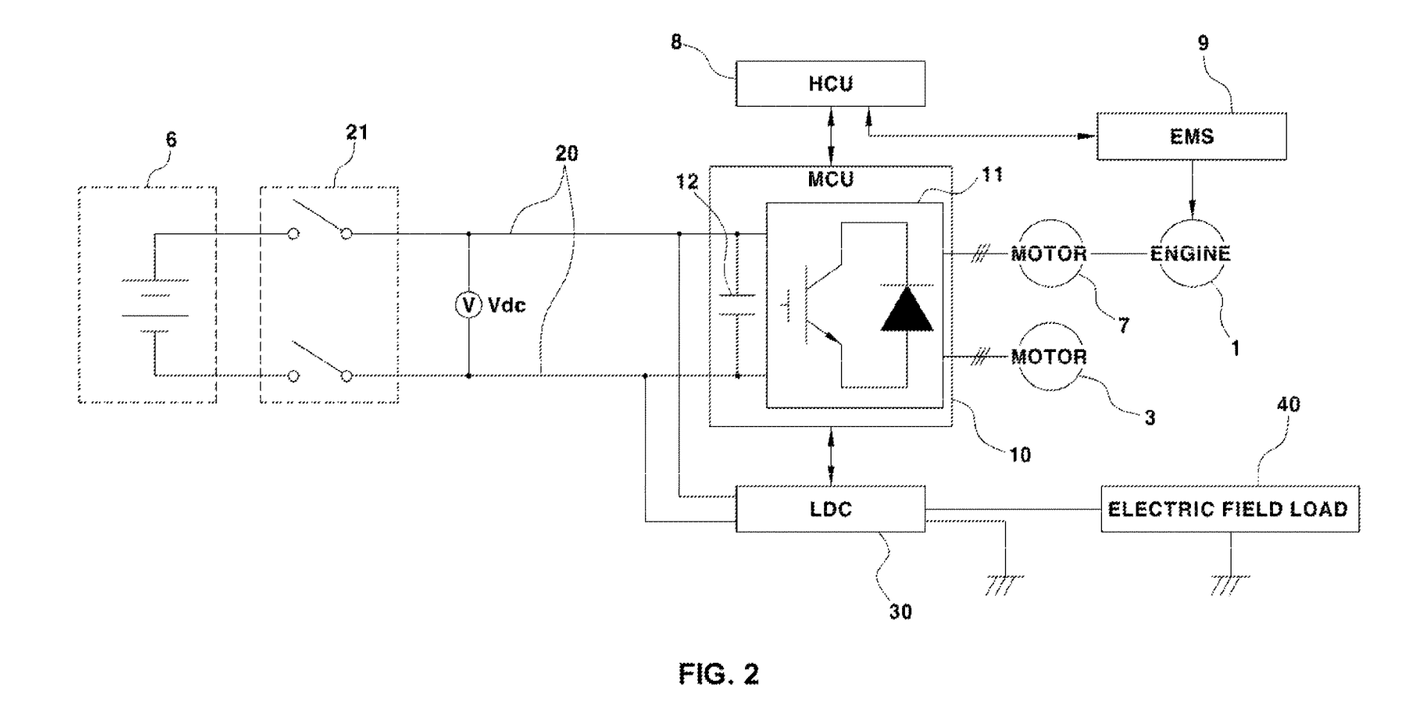
FIG. 2 is a diagram illustrating a structure of a high-voltage circuit portion applied to a HEV.

FIG. 2 is a diagram illustrating a structure of a high-voltage circuit portion applied to a HEV. FIG. 2 illustrates an engine 1 as a vehicle driving source and having an EMS 9 for controlling an operation of the engine 1. The circuit portion has a high-voltage main battery 6, one or more motors 3 and 7, and a MCU 10 including an inverter 5 (refer to FIG. 1) for driving and controlling the motors 3 and 7. The circuit portion also has a main relay 21 installed at a DC link end 20 between the main battery 6 and the inverter 5 and for connecting or shutting off a high voltage. The circuit portion also has a low voltage DC-DC converter 30 (LDC) as a DC-DC converter that supplies power to an electric field load 40 from the main battery 6, and a HCU 8 as a higher controller for controlling an overall operation of a hybrid system.

As illustrated in FIG. 2, the main relay 21 for connecting and shutting off power may be installed between the main battery 6 and the inverter 5. A power module 11, including a switching device and a high voltage capacitor 12, may be installed in the inverter 5.

The one or more motors may include the driving motor 3 as a driving source for vehicle driving and a HSG 7 as a motor connected to the engine 1.

The driving motor 3 is connected to the engine 1 through an engine clutch 2 (refer to FIG. 1) and the HSG 7 is connected directly to the engine 1 through a power transmission mechanism such as a belt or pulley. Thus, both motors are connected to an engine so as to transmit power thereto.

Hereinafter, the driving motor 3 as a vehicle driving source will be referred to as a first motor. Other motors connected to the engine 1 so as to transmit power thereto, e.g. the HSG 7 connected directly to the engine 1 so as to transmit constant power thereto, will be referred to as a second motor.

The first motor 3 and the second motor 7 may be driven by receiving power of the main battery 6. The MCU 10 may control driving of switching devices in the inverter 5 and convert a DC voltage into a 3-phase AC voltage to apply each phase current to each of the first and second motors 3 and 7.

The LDC 30 may be a device functioning as an alternator of a general gasoline engine in an eco-friendly vehicle. The LDC 30 may convert power between the main battery 6 and the low-voltage electric field load 40. The LDC 30 may further drop a high voltage of the main battery 6 and apply the dropped voltage to an auxiliary battery (low-voltage battery) or other devices in the vehicle, such as, the low-voltage electric field load 40.

The HEV to which the enforced discharge is applied according to the present disclosure may be a transmission mounted electric device (TMED) hybrid vehicle including a hybrid system illustrated in FIG. 1. The present disclosure, however, is not limited thereto.

In the TMED hybrid vehicle, an output end of the driving motor 3, as a first motor, is connected directly to a transmission 4. The transmission 4 is, in turn, connected to a driving wheels of the vehicle (refer to FIG. 1, wheels connected to the front differential (FD)).

The present disclosure relates to an enforced discharge technology of turning off the main relay 21 (main relay off) and then discharging high-voltage electric energy formed in the capacitor 12 of the inverter 5 in order to discharge a voltage of a high-voltage system, including the capacitor 12, to ensure safety of a driver or operator. The discharge may be of the entire voltage or high voltage.

In particular, the present disclosure relates to a method of discharging a voltage formed in a high-voltage system to safely remove risk factors due to a high voltage when enforced discharge is requested. In this embodiment, the engine 1 may be pre-stopped via the MCU 10 in order to eliminate counter electromotive force, prior to enforced discharge, so as to inhibit counter electromotive force being generated.

As described above, an HEV that receives electric energy required in the motors 3 and 7 from the high-voltage main battery 6 or recovers regenerative energy to the main battery 6 through the motors 3 and 7 may include the high voltage capacitor 12 in the inverter 5. A high voltage may be formed in the high voltage capacitor 12 after the vehicle is turned on.

In the HEV, when the main relay 21 needs to be turned off due to a protective mode or failure of a specific system, such as a motor, and the vehicle is driven in a limp-home mode or is shut down, i.e., when a high voltage needs to be shut off, a high voltage formed in the capacitor 12 of the inverter 5 is enforced-discharged in order to ensure safety of a driver or operator.

Here, to help the understanding of the present disclosure, conventional enforced discharge will be described in more detail below with reference to FIG. 3.

Figure 3:
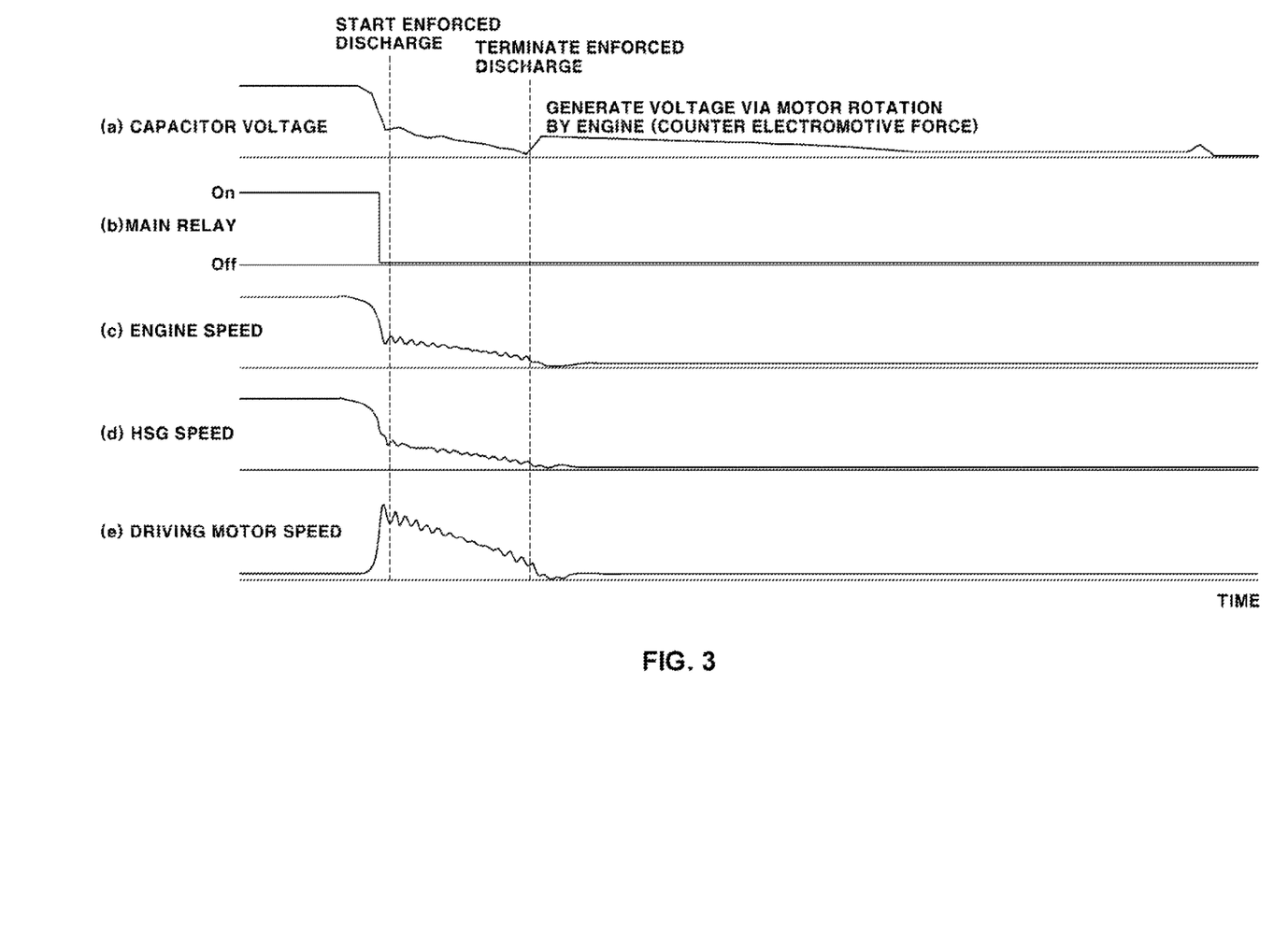
FIG. 3 is a diagram illustrating a timing chart depicting a potential safety issue during conventional enforced discharge.

FIG. 3 is a diagram illustrating a timing chart depicting a potential safety issue during conventional enforced discharge that is addressed by the present disclosure.

Conventionally, even if a main relay is turned off due to a specific problem during engine driving and enforced discharge is performed, a predetermined time (natural attenuation time of rotational motion) is taken to stop an engine and thus a motor connected to the engine is also simultaneously rotated.

In this arrangement, a counter electromotive force is generated due to motor rotation and a voltage remains in a capacitor even after enforced discharge is terminated creating a potential safety issue.

Referring to FIG. 3, when a capacitor voltage is high during engine rotation (a), a main relay may be turned off and shut down due to failure of a specific system such as a motor or entrance into a protective mode (b) and, in this case, enforced discharge in a high-voltage system is required.

Fuel injection is stopped to turn off an engine and thus engine speed (c) and HSG speed (d) associated with the engine may gradually decrease.

As described above, it takes a predetermined time for the engine speed (c) to reach a complete stop velocity (0 rpm), and cease rotation. While the engine is turned off, but still rotating according to inertia between start and termination of enforced discharge, engine rotation and speed remains.

Accordingly, the HSG connected directly to the engine may also be simultaneously rotated.

The driving motor (first motor 3) is also capable of receiving engine rotation force through an engine clutch 2 as the engine clutch 2 (normal close type) is in a closed state and, thus, driving motor speed (e) may also be increased and then reduced.

Accordingly, as described above, when the motor 3 is rotated by the engine, counter electromotive force may be generated and after enforced discharge is terminated, a voltage is also formed in a high-voltage system including a capacitor 12.

According to the present disclosure, in order to overcome the problem, when enforced discharge is required, an engine may be pre-stopped via motor control.

Figure 4:
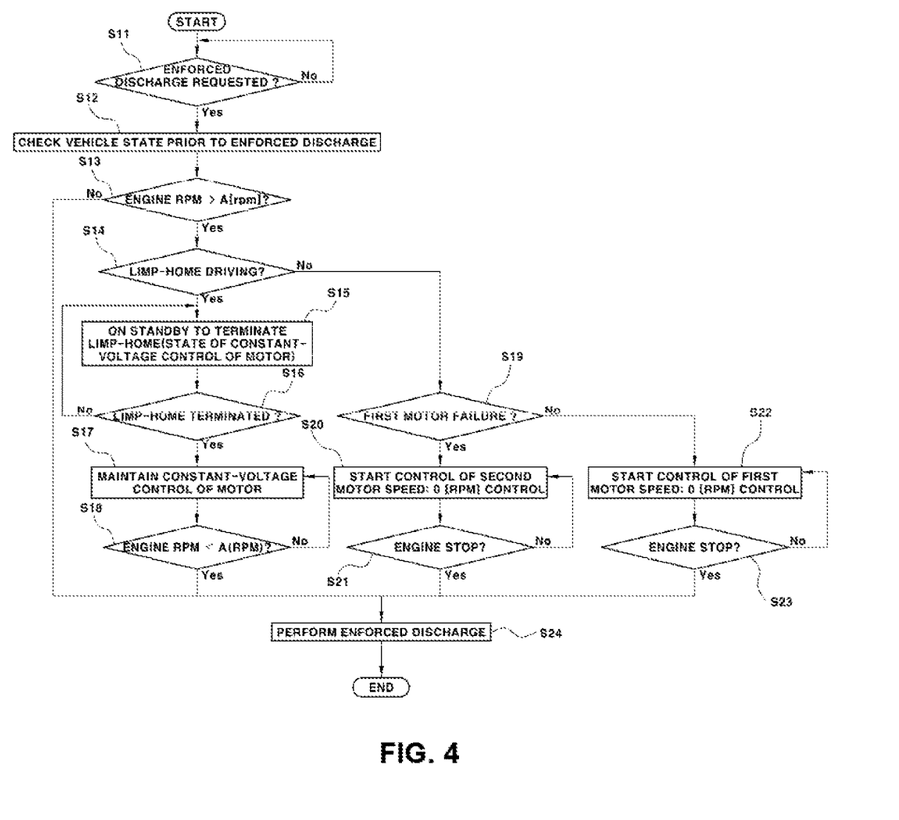
FIG. 4 is a flowchart illustrating an enforced discharge procedure of a HEV according to an embodiment of the present disclosure.

Hereinafter, an enforced discharge procedure according to an embodiment of the present disclosure will be described with reference to FIG. 4.

In this embodiment, the illustrated enforced discharge procedure according to the present disclosure may be performed by a single controller or a plurality of controllers installed in a vehicle.

In one embodiment, the enforced discharge procedure according to the present disclosure may be performed via cooperative control of the EMS 9 and the HCU 8 and the MCU 10 as higher controllers.

The enforced discharge procedure according to the present disclosure may be performed by a single controller, i.e., one integrated controller and a controller to be described later refers to a plurality of controllers or one integrated controller that performs a corresponding function.

First, a controller may determine whether enforced discharge is requested (S11).

In this embodiment, a case in which enforced discharge is requested may include an instance where the high-voltage main relay 21 is turned off due to failure of a specific system. A failure of a specific system may include a motor or entrance into a protective mode as in a conventional case, an instance where a vehicle requires to be driven in a limp-home mode, the vehicle requires a shut down due to main relay off, and other well-known emergency states in which a high voltage needs to be shut off.

As a result, the controller may check a vehicle state (S12).

In one embodiment, the controller checks whether engine rpm detected by an rpm detector is greater than a predetermined set speed A, whether a current mode is a vehicle shut-down mode due to failure or a limp-home driving mode, whether failure occurs in a motor applying a state of a high voltage, and so on.

The present disclosure discloses an engine stopping method that may be pre-performed in order to conduct effective enforced discharge when enforced discharge is requested during engine rotation.

Accordingly, when the engine is rotated, i.e., when engine rpm is greater than the set speed A, a logic including the following operations may be executed.

When current engine rpm is compared with the set speed A (S13) and is equal to or less than the set speed A, enforced discharge may be immediately performed (S24).

In this embodiment, the set speed A may be set to maximum speed for stopping engine rpm only via natural attenuation during enforced discharge.

The limp-home driving mode is a mode in which a vehicle is restrictedly driven by driving force of an engine in a driving state after the engine is turned on, and a controller may perform constant-voltage control using the second motor 7 during limp-home driving.

In more detail, when a vehicle is not capable of being driven using a driving motor 3 due to failure of the driving motor 3, restrictive vehicle driving, i.e., limp-home driving may be performed using driving force of the engine 1 when an engine clutch 2 is closed.

In this embodiment, the driving force (rotational force) of the engine 1 may be transmitted along paths of the engine clutch 2, the driving motor 3, the transmission 4, a driving shaft, and a driving wheel coupled to the front differential FD in the components illustrated in FIG. 1 so as to drive the vehicle.

The main relay 21 installed at the DC link end 20 may be turned off in an engine driving state during limp-home driving and, then, constant-voltage control of a motor, such as the second motor 7, for limp-home driving may be performed during engine driving.

Constant-voltage control for maintaining a DC link end voltage Vdc at a specific voltage (e.g., 240 V) using the second motor 7 (i.e., the HSG) connected to the DC link end 20 through the inverter 5 (refer to FIG. 1) may be performed.

In this instance, control may be performed to maintain the DC link end voltage Vdc in a constant-voltage state via electricity generation (energy regeneration) of the second motor 7 (i.e., the HSG) for receiving rotational force of the engine 1.

When constant-voltage control is performed using the second motor 7, even if the high-voltage main relay 21 is turned off, a high voltage may be formed in the capacitor 12, in the inverter 5, and the DC link end 20 using counter electromotive force of the second motor 7 that receives rotational force of the engine 1 during limp-home driving.

As such, during limp-home driving in which the main relay 21 is turned off and power of the main battery 6 is not supplied, the constant-voltage control for maintaining the DC link end voltage Vdc in a constant-voltage state may be performed so as to apply power required for limp-home driving to the vehicle through the DC link end 20 that is maintained in a constant-voltage state.

In one embodiment, when constant-voltage control is performed for maintaining the voltage Vdc of the DC link end 20 in a constant-voltage state through an HGS, i.e., the second motor 7 that receives driving force of the engine 1, devices in the HEV, such as the electric field load 40, may receive required power from the DC link end 20 through the LDC 30 so as to enable restrictive vehicle driving, i.e., limp-home driving.

According to the present disclosure, during limp-home driving when engine rpm is greater than the set speed A, the HEV is on standby to terminate limp-home driving (S14 and S15).

After limp-home driving is checked to be terminated (S16), constant-voltage control using the second motor 7 may be maintained during an engine stop control procedure for turning off an engine due to the stop of limp-home driving (S17).

Engine rpm may be compared with the set speed A while the constant-voltage control is maintained (S18) and when the engine rpm is equal to or less than set speed A, enforced discharge may be performed (S24).

As such, constant-voltage control using the second motor 7 (i.e., the HSG), which has been performed during limp-home driving, may be maintained even after limp-home driving. Engine rpm may be attenuated using a regenerative torque (torque opposite to engine rotation) of the second motor 7.

As described above, when constant-voltage control is maintained and engine rpm is lowered to the set speed A or less, constant-voltage control may be stopped (constant-voltage control off) and then enforced discharge may be performed.

When a current mode is not a limp-home driving mode while the HEV is shut down, a motor available for turning off the engine 1 may be determined (S19).

When failure occurs in the first motor 3, a controller may begin to control speed of the second motor 7 (i.e., the HSG) connected directly to the engine 1, perform zero speed control of reducing speed of the second motor to 0 rpm (S20). and also reduce engine rpm to 0 rpm so as to stop the engine 1 (S21).

As such, when the engine 1 is completely stopped, enforced discharge control may be performed (S24).

The enforced discharge control is a control procedure of performing pulse width modulation, PWM-On control, of a motor in which failure does not occur to discharge a voltage of a high-voltage system including the capacitor 12 and the DC link end 20.

In contrast, when failure does not occur in the first motor 3, for example, when failure occurs in the second motor 7, a controller may begin speed control with respect to the first motor 3 as a driving motor, perform zero speed control of reducing speed of the first motor to 0 rpm in a close state of an engine clutch (in a state in which it is possible to transmit power between the engine and the first motor) (S22), and also reduce engine rpm to 0 rpm so as to stop the engine 1 (S23).

As described above, enforced discharge control may be performed in a state in which the engine 1 is completely stopped (S24).

As such, according to the present disclosure, enforced discharge may be performed when the engine is completely stopped. Thus, problems in terms of motor rotation due to engine speed during enforced discharge. Generation of counter electromotive force thereby, and formation of a high voltage of a capacitor may be overcome.

According to the present disclosure, an enforced discharge method of a HEV is used to perform enforced discharge after an engine is completely stopped via a MCU 10 so as to overcome the aforementioned safety issue. In other words, where a motor is rotated due to non-zero engine speed during enforced discharge generating counter electromotive force and a high voltage is formed in a capacitor even after enforced discharge is terminated.

In addition, a voltage formed in a high-voltage system of a HEV may be enforced-discharged to remove risk factors due to a high voltage and to enhance safety.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for enforced discharge of a hybrid vehicle, the method comprising:
   determining whether enforced discharge is requested;
   speed-controlling a motor connected to an engine so as to transmit power to the engine to reduce speed of the motor to zero revolutions per minute (rpm);
   stopping the engine connected to the speed-controlled motor when the enforced discharge is requested; and
   performing enforced discharge control for enforced-discharging a voltage of a high-voltage system when the engine is stopped.

2. The method of claim 1, further comprising checking a vehicle state comprising determining whether failure occurs in the motor when the enforced discharge is requested,
   wherein, after the checking, the stopping of the engine comprises speed-controlling a motor in which failure does not occur among a plurality of motors connected to the engine so as to transmit power to the engine and stopping the engine.

3. The method of claim 2, wherein the checking includes checking the plurality of motors which comprises:
   a driving motor for driving a vehicle; and
   a hybrid starter generator (HSG) connected directly to the engine so as to transmit power to the engine.

4. The method of claim 2, wherein the vehicle state comprises engine rpm; and
   the checking of the vehicle state comprises comparing the engine rpm with a set speed and performing the enforced discharge control for enforced-discharging the voltage of the high-voltage system without speed-control of the motor when the engine rpm is equal to or less than the set speed.

5. The method of claim 1, further comprising further checking whether a current state is a state in which the engine is rotated when the enforced discharge is requested,
   wherein, in the state in which the engine is rotated, the stopping of the engine and performing of the enforced discharge control are performed.

6. The method of claim 5, wherein the further checking comprises comparing engine rpm with a set speed and performing enforced discharge control for enforced-discharging the voltage of the high-voltage system without speed-control of the motor when the engine rpm is equal to or less than set speed.

7. The method of claim 1, further comprising:
   when the enforced discharge is requested, also checking whether a vehicle is driven in a limp-home mode by engine driving force in a state in which a main relay installed at a DC link end between a main battery and an inverter for motor driving is turned off;

performing constant-voltage control for maintaining a DC link end voltage in a constant-voltage state using a motor connected to the DC link end through the inverter and receiving driving force of the engine to generate electricity during limp-home driving;

maintaining the constant-voltage control using the motor during an engine stop control procedure for stopping the engine when the limp-home driving is terminated; and further stopping the constant-voltage control after the engine is stopped and performing the enforced discharge control for enforced-discharging the voltage of the high-voltage system.

8. The method of claim 7, wherein, after the limp-home driving is terminated, the engine rpm is compared with the set speed while a state of the constant-voltage control is maintained and the enforced discharge control is performed when the engine rpm is equal to or less than the set speed.

9. The method of claim 7, wherein the constant-voltage control is performed using a hybrid starter generator (HSG) connected directly to the engine so as to transmit constant power to the engine during and after the limp-home driving.

10. The method of claim 1, wherein the enforced discharge control is a control for discharging a capacitor voltage in an inverter in a state in which a main relay installed at a DC link end between a main battery and the inverter for motor driving is turned off.

* * * * *